May 22, 1951 E. G. GUNN 2,553,820
FILTER ELEMENT
Filed April 23, 1948
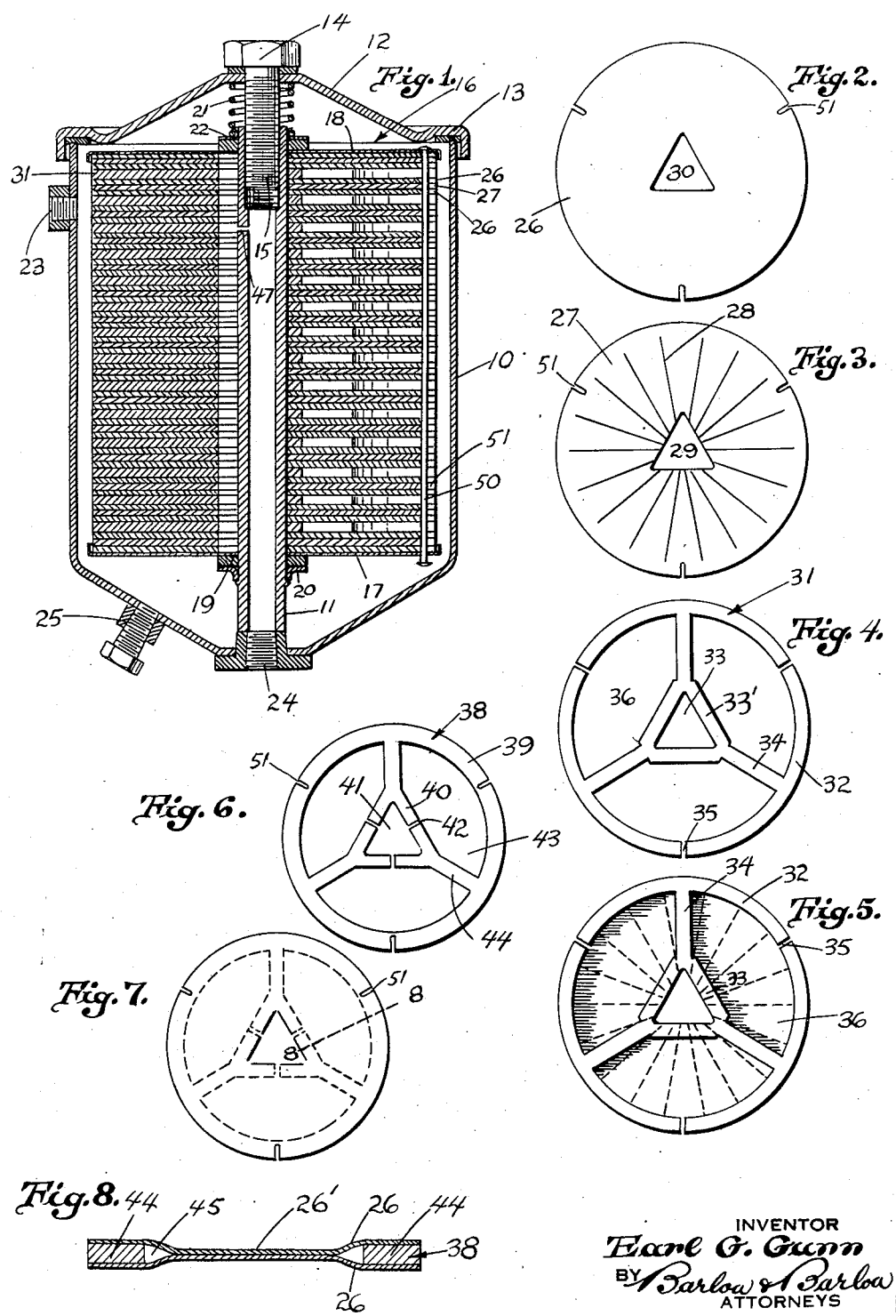
INVENTOR
Earl G. Gunn
BY Barlow & Barlow
ATTORNEYS Patented May 22, 1951

2,553,820

UNITED STATES PATENT OFFICE 2,553,820

FILTER ELEMENT

Earl G. Gunn, Racine, Wis., assignor to Fram Corporation, a corporation of Rhode Island Application April 23, 1948, Serial No. 22,735

2 Claims. (Cl. 210—169)

This invention relates to filtering, more particularly for filtering oil, either lubricating oil or fuel oil.

In filtering fuel oil or lubrication oil, it is desirable that a high flow rate through the filter be obtained and, also, that the oil be cleaned in a minimum number of passages through the filter element. Paper has been used for such filtration, but frequently when a dense paper is used to remove small particles, a slow flow rate occurs. In previous designs, the flow through the paper is cross-wise through the thickness of the paper or lengthwise through the paper in the direction of its greatest surface. This latter form of filtration usually is such that a high flow rate cannot readily occur if a removal of small particles is to be had. Cross flow filter elements usually are exposed to high pressure on one side and low pressure on the other side of the filter medium. Therefore, a rigid self-sustaining medium, such as paper, is required to prevent collapse of the filter element. Such structure usually either reduces the filter flow or causes poor filtering. Furthermore, usually costly gluing procedures are required to prevent the unfiltered liquid from bypassing the filter medium.

One of the objects of this invention is to provide a cross flow paper filter with a relatively high flow rate and, also, a filter which will remove small particles.

Another object of this invention is to provide a filter element formed of an assembly of layers of paper having different characteristics with dirt collecting spaces between.

Another object of this invention is to provide a sealing at the desired location of the layers of paper, one stacked upon the other, by pressure upon the entire stack.

Another object is to provide spacer and bleeder plies by the shaping or formation of the structure of the paper unit.

Another object is to provide a stack which may have the required qualities of filtering, without the filtering paper being sufficiently stiff to be self-sustaining, but rather of a high flow and good straining quality.

With these and other objects in view, the invention consists of certain novel features of construction, as will be more fully described and particularly pointed out in the appended claims.

In the accompanying drawings:

Fig. 1 is a sectional view of a filter body and removable filter element within;

Fig. 2 is a plan view of one of the straining members of the filter element;

Fig. 3 is a plan view of the bleeder member of the filter element;

Fig. 4 is a plan view of the spacer member of the filter element;

Fig. 5 is a plan view illustrating the assembly of the discs shown in Figs. 2, 3 and 4;

Fig. 6 is a plan view of modified structure of bleeder member;

Fig. 7 is a plan view of the assembly of two of the discs of Fig. 2 and the modified disc of Fig. 6;

Fig. 8 is a sectional view on line 8—8 of Fig. 7.

In proceeding with this invention, I provide four members in the sequence of strainer, bleeder, strainer, spacer. Each of these members consist of a disc formation of different thicknesses and varying as to the quality or softness of paper. Preferably the strainer disc will be a relatively thin dense paper so as to remove fine particles of material from the liquid to be filtered. The bleeder will consist of a disc of a relatively soft paper through which the filtrate passes readily, or the bleeder may be in a form of a skeleton which will provide a space for the unobstructed flow of the filtrate. The spacer which is placed between two discs will be relatively thick depending upon the quantity of contaminant which is to be held as the filtrate passes through the filter element. This thickness may be varied as conditions may require. The members in this series are stacked one upon the other and held in this stacked relation by any suitable means. Each of the members are of the same shape, and their outer peripheries will register and be in contact throughout the entire area of the periphery with the exception of an opening for the liquid to enter the spacers.

These members are, also, each provided with a central opening, and the margin of the surface about these openings will register with one another, and contact throughout substantially their entire extent, with the exception possibly of there being a space in the bleeder for the filtrate to pass through. By this arrangement, pressure upon the outer peripherial edge and upon the margin about the center opening will seal these discs against passage of liquid except where openings are provided to pass the liquid.

With reference to the drawings, 10 designates the filter body which is provided with a center tube, 11, extending upwardly from the bottom thereof. A cover 12 fits the upper edge of the body and the soft gasket 13 serves to seal the edge of the body and the cover. The cover is held in position by a removable screw 14 which threadingly engages the inner surface of the center tube 11 as at 15.

The filter element designated generally 16 consists of a stack of paper discs with bottom plate 17 and top plate 18 and rests upon a gasket 19 on an abutment 20 secured to the center tube and is forced downwardly by spring 21 engaging a washer on gasket 22 so that these gaskets 19 and 22 form a seal for the element about the center tube. The liquid to be filtered enters the body 10 at the opening 23, passes through the filter element and then outwardly through the center tube as at 24. The drain plug 25 may be provided in the bottom wall of the filter body.

The filter element 16 consists of a series of members or discs. The filtering or straining disc 26 is of thin paper of a relatively dense quality having an out of round central opening 30 for indexing. The bleeder disc or member 27 is of a rather loose paper such as soft blotting paper having a central opening 29 of the same shape as opening 30 and in order to assist the passage of filtrate to the central opening, cuts or slots 28 may be provided extending radially from the center opening 29 of this disc out to a point just short of the periphery leaving an uncut continuous marginal edge. A disc 26 is placed on either side of the bleeder member 27 as shown in Fig. 1. The bleeder member 27 not only serves the purpose of assisting the passage of filtrate with a minimum of flow resistance, but also of forming a pressure balanced unit of bleeder and straining discs. Because of the support given by the bleeder member, the straining disc cannot collapse and consequently can be made from a thin, high-flow paper.

A spacer member 31 is positioned between such assembly as indicated above in the series of members in the stack. The spacer member 31 consists of disc having an annular outer ring 32 and a central out of round opening 33 of the same shape as openings 29 and 30 having a margin 33' about it with spokes 34 connecting this inner portion 33' with the outer portion 32. Slots 35 are positioned centrally between the radial spokes 34 joining the outer annular portion 32 so that there may be a free passage through this annular outer portion 32 to the space 36 provided between these two portions. A spacer member is placed between two discs 26 in the series.

In some cases instead of there being a bleeder member such as 27, a bleeder member may take the form of a disc shown at 38 in Fig. 6, consisting of an outer annular portion 39 and inner portion 40, surrounding the center out of round opening 41 and connected to the outer portion 39 by spokes 44. In this case slots 42 are provided in the inner portion 40 so that any filtrate which may reach the space 43 between the portions 39 and 40 may enter the center opening 41 without restriction.

In cases where discs 26 are placed on either side of a bleeder member 38 the pressure on either side of these discs may cause portions of them which are unsupported by the spokes 44 to be collapsed into contact with each other as at 26' (see Fig. 8). However, even though this may occur, a space 45 adjacent the spokes 44 or adjacent to supports 39 or 40 which is between discs 26 will provide a channel through which filtrate may flow.

It will be apparent from the above that liquid in the filter body 10 may enter the space 36 in the spacer members through the opening 35 and then pass crosswise through the thin discs 26 into the bleeder 43 or into the bleeder member 27 with flow relief 28 and then to the central opening and from there enter the center tube through the hole 47 and then out through the center tube.

The spring pressure on the upper plate of the filter element aided by the hydraulic pressure on the entire stack will cause a seal at the outer edges and at the inner center portions so that the path of liquid will be as above described. A very high flow rate may be provided in this manner and yet small particles may be removed from the liquid to be filtered.

The members are held in indexed relation by rods 50 located in notches 51 in the edges of the members.

I claim:

1. A filter element comprising a stack of units, each unit comprising a plurality of layers of sheet material serving different functions and in the sequence of strainer member, bleeder member, strainer member, spacer member, wherein the outer peripherial edges of the members are the same and sufficiently continuous to seal along their contacting surfaces when pressure is applied thereto, and said strainer member is a permeable paper material and said bleeder member is of continuous material with a central opening and a plurality of preformed depressions in its surfaces extending radially outwardly from said opening along flaring lines to a location short from the outer peripherial edge and said spacer member provides a void area for entrance from the peripherial edge of fluid to be filtered and for collection of contaminant.

2. A filter element comprising a stack of sheet members including a bleeder member between two strainer members each formed of a porous collapsible material to pass filtrate through its thickness axially of the stack, each of said members being of substantially the same shape and surface area, said bleeder member having radial depressions in its surface which contacts a strainer member so that the bleeder member although functioning as a bleeder also supports the group of said members against hydraulic pressure tending to collapse the strainer members toward each other, said radial depressions extending from a drainage opening outwardly along flaring lines.

EARL G. GUNN.

REFERENCES CITED

The following references are of record in the file of this patent:

UNITED STATES PATENTS

| Number | Name | Date |
|---|---|---|
| 1,061,928 | Seavey | May 13, 1913 |
| 1,694,939 | Heftler | Dec. 11, 1928 |
| 1,726,035 | Loew | Aug. 27, 1929 |
| 1,872,430 | Ericson | Aug. 16, 1932 |
| 2,359,475 | Gauthier | Oct. 3, 1944 |
| 2,436,108 | Heftler | Feb. 17, 1948 |
| 2,472,012 | Hanneman | May 31, 1949 |
| 2,501,582 | Rohland | Mar. 21, 1950 |